Jan. 7, 1964 R. M. HUBBARD 3,117,234

TIME DELAY CIRUITS

Filed July 22, 1959 2 Sheets-Sheet 1

INVENTOR.
ROBERT M. HUBBARD

BY K. H. Thomas

ATTORNEY

Jan. 7, 1964 R. M. HUBBARD 3,117,234

TIME DELAY CIRUITS

Filed July 22, 1959 2 Sheets-Sheet 2

INVENTOR.
ROBERT M. HUBBARD

BY [signature]

ATTORNEY

United States Patent Office 3,117,234

Patented Jan. 7, 1964

3,117,234

TIME DELAY CIRCUITS

Robert M. Hubbard, Kent, Wash., assignor to Boeing Airplane Company, Seattle, Wash., a corporation of Delaware Filed July 22, 1959, Ser. No. 828,783
6 Claims. (Cl. 307—88)

This invention relates to electrical time-delay circuits and more particularly to time-delay circuits of the magnetic type.

The subject application is related to patent applications Serial Nos. 828,749, now Patent No. 3,002,145, and 828,750, now abandoned, entitled "Full-Wave Magnetic Amplifiers" and "Magnetic Amplifiers," respectively, and filed even date herewith by Robert M. Hubbard.

A number of time-delay circuits of the magnetic type are now in existence. However, these prior art time-delay circuits have certain disadvantages. For instance, many of these time-delay circuits require a multiple winding transformer for supplying power to the time-delay circuit. In addition, often times biasing is required for each stage of the time-delay circuit, thereby rendering the time-delay circuit susceptible to drift. Further, in many of these prior art time-delay circuits, the output from each stage is dependent upon the magnitude of the supply voltage for the time-delay circuit. Thus the magnitude of the output voltage from each stage varies in accordance with the magnitude of the supply voltage. Thus, these disadvantages are such as to effect the drift characteristics, complexity, and cost of the time-delay circuit.

Therefore, an object of this invention is to provide for simplifying a magnetic type time-delay circuit by connecting the reset circuit of each successive stage in parallel circuit relationship with the gate circuit of the previous stage.

Another object of this invention is to provide a multi-stage magnetic type time-delay circuit in which a single supply source without a multiple winding transformer is utilized for supplying all of the supply power to the time-delay circuit.

A further object of this invention is to provide for eliminating biasing on all but the first stage of a multi-stage magnetic time-delay circuit, thereby simplifying and improving the drift characteristics of the time-delay circuit.

Still another object of this invention is to provide for rendering the output of each stage of a magnetic type time-delay circuit substantially independent of the magnitude of the supply voltage for the time-delay circuit.

Other objects of this invention will become apparent from the following description when taken in conjunction with the accompanying drawings in which.

Figure 2:
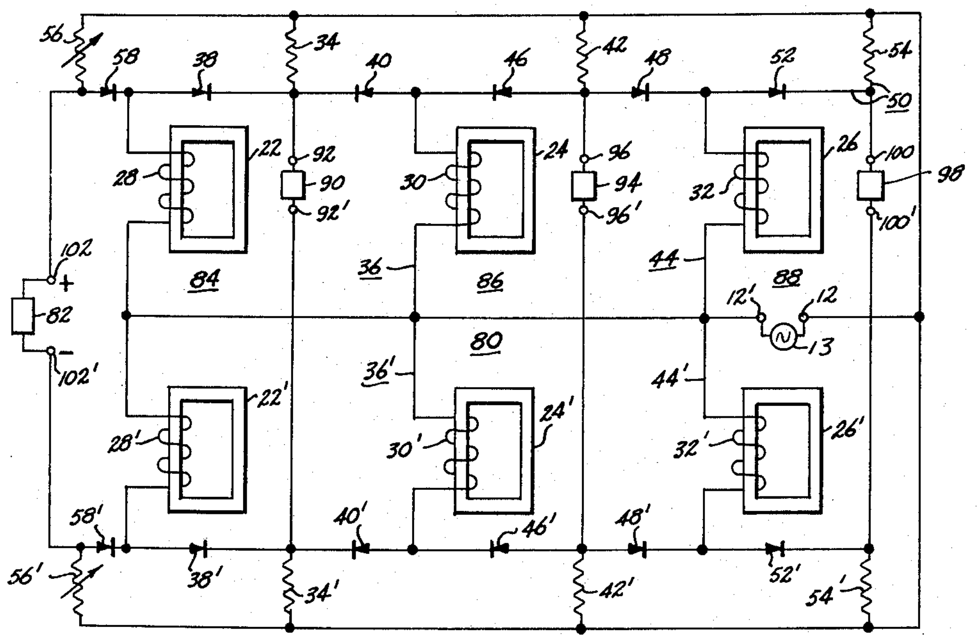
FIG. 2 is a multi-stage magnetic type time-delay circuit embodying further teachings of this invention in which the time-delay circuit is adapted to be controlled by a differential control voltage and a single winding is provided on each of the magnetic core members of the time-delay circuit for effecting both gating and resetting of the magnetic core member.
Figure 3:
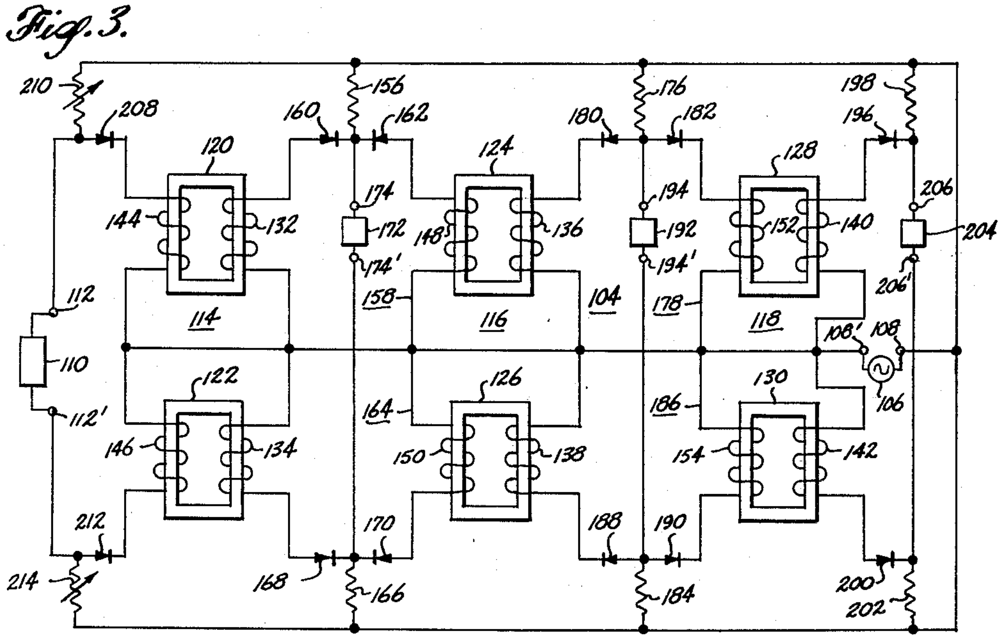
Figure 4:
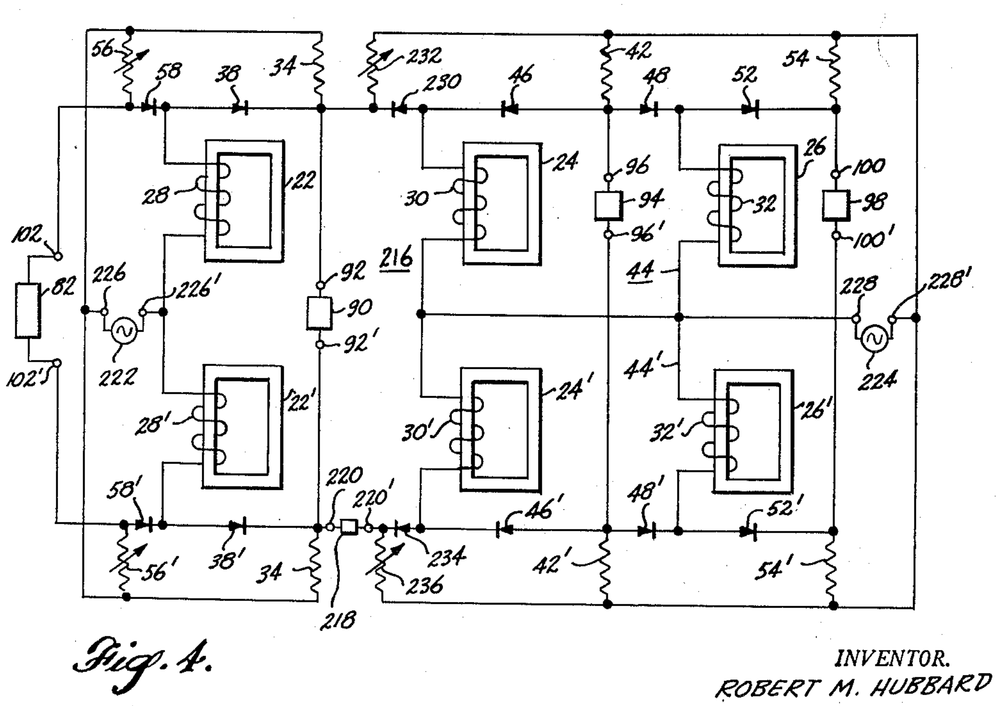

FIG. 3 is a schematic diagram of a magnetic type time-delay circuit similar to that of FIG. 2 except that a separate winding is provided on each of the magnetic core members for effecting a gating and resetting of the magnetic core member; and FIG. 4 is a schematic diagram of a magnetic time-delay circuit similar to that illustrated in FIG. 2 except that the time-delay circuit of FIG. 4 is adapted to have another control signal introduced between the first and second stage.

Figure 1:
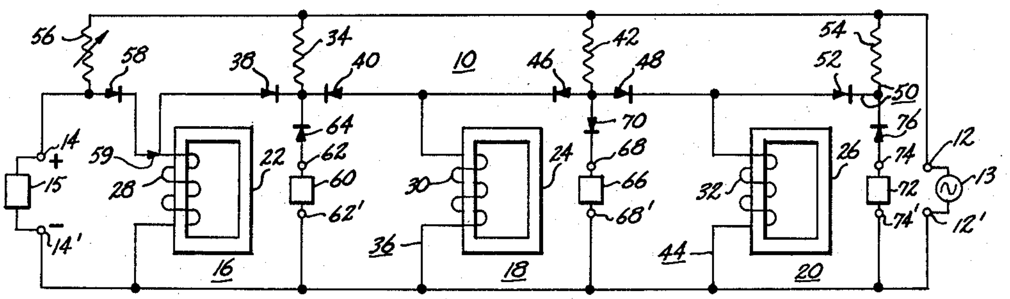
FIG. 1 is a schematic diagram of a single-ended multi-stage magnetic time-delay circuit embodying teachings of this invention.

Referring to FIG. 1 there is illustrated a magnetic type time-delay circuit 10 embodying teachings of this invention in which the time-delay circuit 10 is adapted to be connected to supply terminals 12 and 12' which are disposed to be connected to a source 13 of alternating voltage. Control terminals 14 and 14' are disposed to be connected to a source 15, the polarity of whose output voltage is as indicated in FIGURE 1. However, for a different type of operation than that described hereinafter, the polarity of the control source 15 can be reversed from that shown in FIG. 1. In practice, the source 15 should have sufficient internal impedance to limit the flow of current from source 13 through the source 15.

In general, the time-delay circuit 10 comprises three stages 16, 18 and 20. In this instance, the stages 16, 18 and 20 comprise magnetic core members 22, 24 and 26, respectively, and windings 28, 30 and 32 disposed in inductive relationship with their respective magnetic core members 22, 24 and 26. Stages 16 and 20 are gated while stage 18 is being reset. When stage 18 is gated, stages 16 and 20 are being reset. It is common for ease of description to refer to gating of a core to positive saturation and then resetting the core away from positive saturation toward negative saturation. However, this is just a matter of choice, and one could refer to gating a core to negative saturation and the resetting the core toward positive saturation.

In accordance with this invention, a current-limiting resistor 34 and a parallel circuit 36 is connected in series circuit relationship with respect to the source 13. As illustrated, one branch of the parallel circuit 36 includes the winding 28 and a rectifier 38 and the other branch of the parallel circuit 36 includes the winding 30 and a rectifier 40. The rectifiers 38 and 40 are so poled as to permit, only during alternate half-cycles of the output of the source 13 when the supply terminal 12' is at a positive polarity with respect to the supply terminal 12, the flow of current from the supply terminal 12' through both branches of the parallel circuit 36, and the current-limiting resistor 34, to the supply terminal 12, to thereby effect a gating of the magnetic core member 22 and a resetting of the magnetic core member 24 during this portion of the operation. In like manner, a current-limiting resistor 42 and a parallel circuit 44 is connected in series circuit relationship with respect to the source 13. As shown, one branch of the parallel circuit 44 includes the winding 30 and a rectifier 46 and the other branch of the parallel circuit 44 includes the winding 32 and a rectifier 48. In this instance, the rectifiers 46 and 48 are so poled as to permit, only during those other alternate half-cycles of the output of the source 13 when the supply terminal 12 is at a positive polarity with respect to the supply terminal 12', the flow of current from the supply terminal 12 through the current-limiting resistor 42, and both branches of the parallel circuit 44, to the supply terminal 12', to thereby effect a gating of the magnetic core member 24 and a resetting of the magnetic core member 26 during these alternate half-cycles of the operation.

In order to effect a gating of the magnetic core member 26, when the supply terminal 12' is at a positive polarity with respect to the supply terminal 12, circuit means 50 is provided. As shown, the circuit means 50 includes a rectifier 52 and a current-limiting resistor 54; the winding 32, the rectifier 52, and the current-limiting resistor 54 being connected in series circuit relationship with respect to the source 13. In operation, the rectifier 52 functions to block the flow of current through the current-limiting resistor 54 when the supply terminal 12 is at a positive polarity with respect to the supply terminal 12'. On the other hand, the current-limiting resistor 54 limits the flow of current through the winding 32 when the magnetic core member 26 is saturated. In like manner, the current-limiting resistors 34 and 42 limit the flow of current through the windings 28 and 30 when their respective magnetic core members 22 and 24 are saturated.

For the purpose of effecting a biasing of each of the magnetic core members 22, 24 and 26, an adjustable biasing resistor 56 is connected in series circuit relationship with a rectifier 58 and with the winding 28, the series circuit being connected to the source 13 of alternating supply voltage. In operation, the rectifier 58 functions to prevent the flow of current through the biasing resistor 56 when the supply terminal 12' is at a positive polarity with respect to the supply terminal 12. As illustrated, the control source 15 is connected to the winding 28 through the rectifier 58 and a movable tap 59 which is disposed to be actuated along the winding 28, to thus provide for higher gain in the stage 16 when the tap 59 is disposed in a position lower than that shown.

In order to obtain a voltage across a load 60, that is proportional to the voltage across the winding 28 when the magnetic core member 22 is being gated, the load 60 is connected in series circuit relationship with load terminals 62 and 62' and with a rectifier 64 which functions to block the flow of current through the load 60 when the magetic core member 22 is being reset to a given flux level. In like manner, in order to obtain a voltage across a load 66 in accordance with the voltage appearing across the winding 30 when the magnetic core member 24 is being gated, the load 66 is connected in series circuit relationship with respect to load terminals 68 and 68' and with respect to a rectifier 70 which functions to prevent the flow of current through the load 66 when the magnetic core member 24 is being reset to a given flux level. Similarly, for the purpose of obtaining a voltage across a load 72 that is proportional to the magnitude of the voltage appearing across the winding 32 when the magnetic core member 26 is being gated, the load 72 is connected in series circuit relationship with respect to load terminals 74 and 74' and with respect to a rectifier 76 which functions to prevent the flow of current through the load 72 when the magnetic core member 26 is being reset.

The operation of the time-delay circuit 10 will now be described. Assuming the supply terminal 12 is at a positive polarity with respect to the supply terminal 12' biasing current flows from the supply terminal 12 through the biasing resistor 56, the rectifier 58 in the forward direction, and the winding 28, to the supply terminal 12', to thus effect a bias of the magnetic core member 22 in accordance with the setting of the adjustable biasing resistor 56 and in accordance with the magnitude of the supply voltage of the source 13. The flux level in the magnetic core member 22 is also set to a level in accordance with the magnitude of the direct-current control voltage appearing across the control terminals 14 and 14'. In operation, control current flows, when the supply terminal 12 is at a positive polarity with respect to the supply terminal 12', from the control terminal 14 through the rectifier 58, and the winding 28, to the control terminal 14'.

During the next half-cycle of operation, when the supply terminal 12' is at a positive polarity with respect to the supply terminal 12, current flows from the supply terminal 12' through both branches of the parallel circuit 36, and the current-limiting resistor 34, to the supply terminal 12, to thereby effect a gating of the magnetic core member 22 and a resetting of the magnetic core member 24. It is to be noted that the magnetic core member 24 is being reset until the magnetic core member 22 is driven to saturation, and therefore the amount that the magnetic core member 24 is reset is in proportion to both the magnitude of the biasing current and control current that flowed through the winding 28 during the previous half-cycle of operation. Thus, the sources 13 and 15 effect both biasing and control of the magnetic core member 24. Simultaneously, during this half-cycle of operation, current flows through the load 60 and the rectifier 64, in the forward direction, to thereby effect a voltage across the load 60 in accordance with the voltage across the winding 28 during this half-cycle of operation.

During the next half-cycle of operation, when the supply terminal 12 is at a positive polarity with respect to the supply terminal 12', current flows from the supply terminal 12 through the current-limiting resistor 42 and both branches of the parallel circuit 44, to the supply terminal 12', to thus effect a gating of the magnetic core member 24 and a resetting of the magnetic core member 26 in accordance with the biasing and control current that previously flowed through the winding 28. At the same time, current flows through the rectifier 70, and the load 66, to thereby effect a voltage across the load 66 in accordance with the voltage appearing across the winding 30 during this latter half-cycle of operation.

During the next half-cycle of operation, when the supply terminal 12' is again at a positive polarity with respect to the supply terminal 12, current flows from the supply terminal 12' through the winding 32, the rectifier 52 in the forward direction, and the current-limiting resistor 54, to the supply terminal 12, to thus effect a gating of the magnetic core member 26. Simultaneously, current flows through the load 72 and the rectifier 76, in the forward direction, to thereby effect a voltage across the load 72 in accordance with the magnitude of the voltage across the winding 32 during this latter half-cycle of operation. Thus, it can be realized that each of the stages 16, 18 and 20 effects a delay in the control current applied to the time-delay circuit 10, however, the magnitude of the voltage appearing across the load 72, of the stage 20, is still proportional to the magnitude of the control voltage appearing acrosss the control terminals 14 and 14'.

Referring to FIG. 2 there is illustrated a magnetic time-delay circuit 80 embodying further teachings of this invention in which the time-delay circuit 80 is adapted to be controlled from a source 82 of direct-current differential control voltage. Like components of FIGS. 1 and 2 have been given the same reference characters. In addition, since the time-delay circuit 80 of FIG. 2 comprises two of the time-delay circuits 10 of FIG. 1 connected in push-pull operation, the upper portion of the time-delay circuit 80 has been given the same reference characters as the time-delay circuit 10 of FIG. 1, and the lower portion of the time-delay circuit 80 has also been given the same reference characters except that they are primed.

The time-delay circuit 80 is also a three-stage time-delay circuit and comprises stages 84, 86 and 88. As illustrated, the stage 84 includes magnetic core members 22 and 22', the stage 86 the magnetic core members 24 and 24' and the stage 88 the magnetic core members 26 and 26'. As explained in connection with FIG. 1, the cores on the left and right in the circuitry of FIG. 2 are gated while the center cores are being reset, and visa versa. This is also true with the circuitry shown in the embodiments of FIGS. 3 and 4.

In order to obtain a voltage at the output of the stage 84 which is proportional to the combined voltage appearing across the windings 28 and 28', a load 90 is connected to load terminals 92 and 92' which are connected respectively to the junction of the rectifiers 38 and 40 and the junction of the rectifiers 38' and 40'. Similarly, in order to obtain a voltage at the output of the stage 86 which is proportional to the combined voltage appearing across the windings 30 and 30', a load 94 is connected to load terminals 96 and 96' which are respectively connected to the junction point of the rectifiers 46 and 48 and the junction point of the rectifiers 46' and 48'. In like manner, in order to obtain a voltage at the output of the last stage 88 which is proportional to the combined voltage appearing across the windings 32 and 32' a load 98 is connected to load terminals 100 and 100' which are respectively connected to the junction point of the rectifier 52 and the current-limiting resistor 54 and the junction point of the rectifier 52' and the current-limiting resistor 54'.

The operation of the time-delay circuit 80 of FIG. 2 will now be described. Assuming the supply terminal 12 is at a positive polarity with respect to the supply terminal 12', biasing current flows from the supply terminal 12 through the biasing resistor 56, the rectifier 58 in the forward direction, and the winding 28, to the supply terminal 12', to thus effect a biasing of the magnetic core member 22 in accordance with the setting of the biasing resistor 56. Simultaneously, biasing current flows from the supply terminal 12 through the biasing resistor 56', the rectifier 58' in the forward direction, and the winding 28', to the supply terminal 12', to thereby effect a biasing of the magnetic core member 22' in accordance with the setting of the biasing resistor 56'. Assuming the output of the control source 82 is such as to render control terminal 102 at a positive polarity with respect to control terminal 102', control current at the same time flows from the control terminal 102 through the rectifier 58, the windings 28 and 28', and the rectifier 38' and the resistors 34' and 56', to the control terminal 102', to thereby set the flux level in the magnetic core members 22 and 22' in accordance with the magnitude of the output of the control source 82. However, the control current flowing through the winding 28 is additive to the biasing current flowing therethrough while the control current flowing through the winding 28' is subtractive from the biasing current flowing through this latter winding. Therefore the magnetic core member 22 is set to a flux level further below positive saturation than is the magnetic core member 22'.

During the next half-cycle of operation, when the supply terminal 12' is at a positive polarity with respect to the supply terminal 12, current flows from the supply terminal 12' through both branches of the parallel circuit 36 and the current-limiting resistor 34, to the supply terminal 12, to thus effect a gating of the magnetic core member 22 and a resetting of the magnetic core member 24, in accordance with the value to which the magnetic core member 22 had been reset during the previous half-cycle of operation. At the same time, current flows from the supply terminal 12' through both branches of the parallel circuit 36', and the current-limiting resistor 34', to the supply terminal 12, to thereby effect a gating of the magnetic core member 22' and a resetting of the magnetic core member 24', in accordance with the flux level to which the magnetic core member 22' had been reset during the previous half-cycle of operation. It is to be noted that during this half-cycle of operation, when the supply terminal 12' is at a positive polarity with respect to the supply terminal 12, the magnetic core member 22' saturates first under the assumed conditions and until this time of saturation the voltage across the windings 28 and 28' are substantially equal and therefore substantially no voltage appears across the load 90. However, once the magnetic core member 22' saturates, the voltage across the winding 28 appears across the load 90 until the magnetic core member 22 saturates, and the polarity of this voltage across the load 90 is such that the load terminal 92' is positive with respect to the load terminal 92. Of course, when both the magnetic core members 22 and 22' become saturated, substantially no voltage appears across the load 90.

During the next half-cycle of operation, when the supply terminal 12 is again at a positive polarity with respect to the supply terminal 12', current flows from the supply terminal 12 through the current-limiting resistor 42 and both branches of the parallel circuit 44, to the supply terminal 12', to thereby effect a gating of the magnetic core member 24 and a resetting of the magnetic core member 26 in accordance with the flux level to which the magnetic core member 24 had been reset during the previous half-cycle of operation. Simultaneously, current flows from the supply terminal 12 through the current-limiting resistor 42', and both branches of the parallel circuit 44' to the supply terminal 12' to thus effect a gating of the magnetic core member 24' and a resetting of the magnetic core member 26' in accordance with the flux level to which the magnetic core member 24' had been reset during the previous half-cycle of operation. Here again, no voltage appears across the load 94 until the magnetic core member 24' saturates. Once the magnetic core member 24' saturates, a voltage appears across the load 94 of such polarity that the load terminal 96 is at a positive polarity with respect to the load terminal 96'. Then when the magnetic core member 24 saturates, substantially no voltage appears across the load 94.

When the supply terminal 12' again becomes positive with respect to the supply terminal 12, current flows from the supply terminal 12' through the winding 32, the rectifier 52 in the forward direction, and the current-limiting resistor 54, to the supply terminal 12, to thus gate the magnetic core member 26. At the same time, current flows from the supply terminal 12' through the winding 32', the rectifier 52' in the forward direction, and the current-limiting resistor 54', to the supply terminal 12, to thereby gate the magnetic core member 26'. Until the magnetic core member 26' saturates, the voltages across the windings 32 and 32' are of substantially equal value and therefore substantially no voltage appears across the load 98. However, once the magnetic core member 26' saturates, a voltage appears across the load 98 of such polarity that the load terminal 100' becomes positive with respect to the load terminal 100. Then when the magnetic core member 26 saturates substantially no voltage appears across the load 98.

If the polarity of the output voltage of the control source 82 reverses so that the control terminal 102' is at a positive polarity with respect to the control terminal 102, control current flows, during the half-cycle of operation when the supply terminal 12 is at a positive polarity with respect to the supply terminal 12', from the control terminal 102', through the rectifier 58', the windings 28' and 28, and the rectifier 38 and the resistors 34 and 56, to the control terminal 102. In this case, the control current flowing through the winding 28' is additive to the biasing current flowing therethrough and the control current flowing through the winding 28 is subtractive from the biasing current flowing through this latter winding, and therefore the magnetic core member 22' is set to a flux level further away from positive saturation than is the magnetic core member 22. Thus, the magnetic core members 22, 24 and 26 saturate before their respective magnetic core members 22', 24' and 26'. The remaining operation of the time-delay circuit 80 is similar to that previously described when it was assumed that the control terminal 102 was at a positive polarity with respect to the control terminal 102' except that the voltages obtained across the loads 90, 94 and 98 are of reverse polarity.

Referring to FIG. 3 there is illustrated a magnetic type time-delay circuit 104 similar to that of FIG. 2 except that a separate winding is provided on each of the magnetic core members for effecting a gating and a resetting of the respective magnetic core members. The time-delay circuit 104 is adapted to be connected to a source 106 of alternating supply voltage, the source 106 being connected to supply terminals 108 and 108'. The control signal for the time-delay circuit 104 is received from a direct-current differential control source 110 which is connected to control terminals 112 and 112'. In general, the time-delay circuit 104 comprises three stages, 114, 116 and 118 which in turn include magnetic core members 120 and 122, 124 and 126, and 128 and 130, respectively. Each of the magnetic core members 120, 122, 124, 126, 128 and 130 have disposed in inductive relationship therewith a separate gate winding and a separate reset winding, specifically, gate windings 132, 134, 136, 138, 140 and 142, respectively, and reset windings 144, 146, 148, 150, 152, and 154, respectively.

In accordance with this invention, a current-limiting resistor 156 and a parallel circuit 158 is connected in series circuit relationship with respect to the supply source 106, one branch of the parallel circuit 158 including a rectifier 160 and the gate winding 132 and the other branch of the parallel circuit including a rectifier 162 and the reset winding 148. In practice, the rectifiers 160 and 162 are so poled as to permit, only during the alternate half-cycles of the output of the source 106 when the supply terminal 108′ is at a positive polarity with respect to the supply terminal 108, the flow of current from the supply terminal 108′ through both branches of the parallel circuit 158, and the current-limiting resistor 156, to the supply terminal 108.

In like manner, a parallel circuit 164 and a current-limiting resistor 166 are connected in series circuit relationship with respect to the source 106, one branch of the parallel circuit 164 including a rectifier 168 and the gate winding 134 and the other branch of the parallel circuit 164 including a rectifier 170 and the reset winding 150. In this case, the rectifiers 168 and 170 are so poled as to permit, only during the alternate half-cycles of the output of the source 106 when the supply terminal 108′ is positive with respect to the supply terminal 108, the flow of current from the supply terminal 108′ through both branches of the parallel circuit 164, and the current-limiting resistor 166, to the supply terminal 108.

In order to obtain a voltage at the output of the stage 114 that is proportional to the combined voltage appearing across the gate windings 132 and 134 during the alternate half-cycles of operation when the supply terminal 108′ is at a positive polarity with respect to the supply terminal 108, a load 172 is connected to load terminals 174 and 174′ with the load terminal 174 connected to the junction point of rectifiers 160 and 162 and with the load terminal 174′ connected to the junction point of the rectifiers 168 and 170.

Also in accordance with this invention, a current-limiting resistor 176 and a parallel circuit 178 is connected in series circuit relationship with respect to the supply source 106, one branch of the parallel circuit 178 including a rectifier 180 and the gate winding 136, and the other branch of the parallel circuit including a rectifier 182 and the reset winding 152. In this instance, the rectifiers 180 and 182 are so poled as to permit, only during the other alternate half-cycles of the output of the source 106 when the supply terminal 108 is at a positive polarity with respect to the supply terminal 108′, the flow of current from the supply terminal 108 through the current-limiting resistor 176 and both branches of the parallel circuit 178, to the supply terminal 108′.

Also in accordance with this invention, a current-limiting resistor 184 and a parallel circuit 186 is connected in series circuit relationship with respect to the supply source 106, one branch of the parallel circuit 186 including a rectifier 188 and the gate winding 138, and the other branch of the parallel circuit 186 including a rectifier 190 and the reset winding 154. As shown, the rectifiers 188 and 190 are so poled as to permit, only during those alternate half-cycles of the output of the supply source 106 when the supply terminal 108 is at a positive polarity with respect to the supply terminal 108′, the flow of current from the supply terminal 108 through the current-limiting resistor 184 and both branches of the parallel circuit 186, to the supply terminal 108′.

In order to obtain an output voltage from the stage 116 that is proportional to the combined voltage appearing across the gate windings 136 and 138 during the alternate half-cycles of operation when the supply terminal 108 is at a positive polarity with respect to supply terminal 108′, a load 192 is connected to load terminals 194 and 194′, the load terminal 194 being connected to the junction point of the rectifiers 180 and 182, and the load terminal 194′ being connected to the junction point of the rectifiers 188 and 190.

For the purpose of effecting a gating of the magnetic core member 128 during the alternate half-cycle of operation when the supply terminal 108′ is at a positive polarity with respect to the supply terminal 108, the gate winding 140 is connected in series circuit relationship with a rectifier 196 and with a current-limiting resistor 198, the series circuit being connected across the supply terminals 108 and 108′. In like manner, in order to effect a gating of the magnetic core member 130 during the same half-cycle of operation the gate winding 142 is connected in series circuit relationship with a rectifier 200 and with a current-limiting resistor 202, the series circuit also being connected across the supply terminals 108 and 108′. In operation, the rectifiers 196 and 200 function to prevent the flow of current through the gate windings 140 and 142 when the supply terminal 108 is at a positive polarity with respect to supply terminal 108′. On the other hand, when the supply terminal 108′ is at a positive polarity with respect to supply terminal 108, the current-limiting resistor 198 functions to limit the flow of current through the gate winding 140 once the magnetic core member 128 reaches saturation and the current-limiting resistor 202 in like manner functions to limit the flow of current through the gate winding 142 when the magnetic core member 130 reaches saturation.

In order to obtain an output voltage from the output of the stage 118 that is proportional to the combined voltage appearing across the gate windings 140 and 142 when the magnetic core members 128 and 130 are being gated, a load 204 is connected to load terminals 206 and 206′, with the load terminal 206 connected to the junction point of the rectifier 196 and the current-limiting resistor 198 and with the load terminal 206′ connected to the junction point of the rectifier 200 and the current-limiting resistor 202.

Bias for the magnetic core members 120, 124 and 128 is effected by connecting the reset winding 144 in series circuit relationship with a rectifier 208 and with an adjustable biasing resistor 210, the series circuit being connected across the supply terminals 108 and 108′. In like manner, biasing of the magnetic core members 122, 126 and 130 is effected by connecting the reset winding 146 in series circuit relationship with a rectifier 212 and with an adjustable biasing resistor 214, the series circuit being connected across the supply terminals 108 and 108′. In operation, the rectifiers 208 and 212 function to prevent the flow of biasing current through the reset windings 144 and 146, respectively, when the supply terminal 108′ is at a positive polarity with respect to the supply terminal 108. The magnitude of the biasing current flowing through the reset windings 144 and 146 can be changed by adjusting the biasing resistors 210 and 214, respectively.

The operation of the time-delay circuit 104 will now be described. During the alternate half-cycles of operation when the supply terminal 108 is at a positive polarity with respect to supply terminal 108′, biasing current flows from the supply terminal 108 through the biasing resistor 210, the rectifier 208 in the forward direction, and the reset winding 144, to the supply terminal 108′, to thereby effect a biasing of the magnetic core member 120. In like manner, biasing current flows during this same half-cycle of operation from the supply terminal 108 through the biasing resistor 214, the rectifier 212 in the forward direction, and the reset winding 146, to the supply terminal 108′, to thereby effect a like biasing of the magnetic core member 122. Assuming the control terminal 112 is at a positive polarity with respect to the control terminal 112', control current flows from the control terminal 112 through the rectifier 208, the reset windings 144 and 146, and the rectifier 212, to the control terminal 112', to thereby set the flux level in the magnetic core members 120 and 122, in accordance with the magnitude of the control voltage appearing across the control terminals 112 and 112'. Since the control current flowing through the reset winding 144 is additive to the biasing current flowing therethrough and the control current flowing through the reset winding 146 is subtractive from the biasing current flowing therethrough, the magnetic core member 120 is reset to a flux level further away from positive saturation than is the magnetic core member 122.

During the next half-cycle of operation, when the supply terminal 108' is at a positive polarity with respect to the supply terminal 108, current flows from the supply terminal 108' through both branches of the parallel circuit 158, and the current-limiting resistor 156, to the supply terminal 108, to thereby effect a gating of the magnetic core member 120 and a resetting of the magnetic core member 124 in accordance with the value to which the magnetic core member 120 had been reset during the previous half-cycle of operation. Simultaneously, current flows from the supply terminal 108' through both branches of the parallel circuit 164, and the current-limiting resistor 166, to the supply terminal 108, to thus effect a gating of the magnetic core member 122 and a resetting of the magnetic core member 126, in accordance with the value to which the magnetic core member 122 had been reset during the previous half-cycle of operation.

Since, during the previous half-cycle of operation, the magnetic core member 122 had not been reset to as low a value below positive saturation as had the magnetic core member 120, the magnetic core member 122 saturates before the magnetic core member 120. Up until the magnetic core member 122 saturates, the voltage across the gate windings 132 and 134 are substantially equal and in opposition and thus substantially no voltage appears across the load 172. However, once the magnetic core member 122 saturates, a voltage appears across the load 172 which is proportional to the voltage appearing across the gate winding 132, the polarity of this voltage being such that the load terminal 174' is at a positive polarity with respect to the load terminal 174. Then, when the magnetic core member 120 saturates, substantially no voltage appears across the load 172.

During the next half-cycle of operation, when the supply terminal 108 is again at a positive polarity with respect to the supply terminal 108', current flows from the supply terminal 108 through the current-limiting resistor 176, and both branches of the parallel circuit 178, to the supply terminal 108', to thereby effect a gating of the magnetic core member 124 and a resetting of the magnetic core member 128 in accordance with the value to which the magnetic core member 124 had been reset during the previous half-cycle of operation. At the same time, current flows from the supply terminal 108 through the current-limiting resistor 184, and both branches of the parallel circuit 186, to the supply terminal 108', thus effecting a gating of the magnetic core member 126 and a resetting of the magnetic core member 130 in accordance with the value to which the magnetic core member 126 had been reset during the previous half-cycle of operation. Once the magnetic core member 126 saturates, a voltage appears across the load 192 of such polarity that the load terminal 194 is at a positive polarity with respect to the load terminal 194'. Then when the magnetic core member 124 saturates, substantially no voltage appears across the load 192.

During the next half-cycle of operation, when the supply terminal 108' again is at a positive polarity with respect to the supply terminal 108, current flows from the supply terminal 108' through the gate winding 140, the rectifier 196 in the forward direction, and the current-limiting resistor 198, to the supply terminal 108, to thus effect a gating of the magnetic core member 128. Simultaneously, current flows from the supply terminal 108' through the gate winding 142, the rectifier 200 in the forward direction, and the current-limiting resistor 202, to the supply terminal 108, to thus effect a gating of the magnetic core member 130. The magnetic core member 130 saturates first and then a voltage appears across the load 204 of such polarity that the load 206' is at a positive polarity with respect to the load terminal 206. Then when the magnetic core member 128 saturates, substantially no voltage appears across the load 204.

Assuming the polarity of the control voltage applied to the control terminals 112 and 112' reverses so that the control terminal 112' is at a positive polarity with respect to the control terminal 112, then control current flows from the control terminal 112' through the rectifier 212, the reset windings 146 and 144, and the rectifier 208, to the control terminal 112. Such an action effects a resetting of the magnetic core members 122 and 120 in accordance with the magnitude of the control voltage appearing across the control terminals 112 and 112', with the magnetic core member 122 being reset to a flux level further away from positive saturation than is the magnetic core member 120. Thus, under the latter assumed conditions, the magnetic core members 120, 124 and 128 saturate before their respective associated magnetic core members 122, 126 and 130, and therefore the voltage appearing across the loads 172, 192 and 204 reverse polarity from the previously described case when the control terminal 112 was at a positive polarity with respect to the control terminal 112'. Otherwise, the operation under the latter assumed conditions is substantially identical to the operation when the control terminal 112 is at a positive polarity with respect to the control terminal 112' and a further description of such operation is deemed unnecessary.

Referring to FIG. 4 there is illustrated a magnetic time-delay circuit 216 similar to the time-delay circuit 80 of FIG. 2, except that the time-delay circuit 216 is adapted to have another control signal introduced between the first and the second stage of the time-delay circuit 216, and in which like components of FIGS. 1, 2 and 4 have been given the same reference characters. Specifically, a direct-current source 218 of control voltage is connected to the control terminals 220 and 220'. Thus, in operation the control voltage appearing across the control terminals 220 and 220' either adds or subtracts from the voltage appearing across the load 90, to thereby effect a resetting of the magnetic core members 24 and 24' in accordance with this combined control voltage.

The supply voltage for the time-delay circuit 216 is received from sources 222 and 224 of alternating supply voltage, the sources being connected to supply terminals 226 and 226', and supply terminals 228 and 228', respectively. In practice, the frequency of the output voltages of the sources 222 and 224 are equal and are so synchronized that when the supply terminal 226 is at a positive polarity with respect to the supply terminal 226' the supply terminal 228' is at a positive polarity with respect to the supply terminal 228.

Biasing of the magnetic core member 24, and thus biasing of the magnetic core member 26, is effected by connecting the winding 30, a rectifier 230, and an adjustable biasing resistor 232 in series circuit relationship with respect to the supply source 224. On the other hand, biasing of the magnetic core member 24', and thus biasing of the magnetic core member 26', is effected by connecting the winding 30' a rectifier 234, and an adjustable biasing resistor 236 in series circuit relationship with respect to the supply source 224. In operation, the rectifiers 230 and 234 prevent the flow of biasing current through the windings 30 and 30', respectively, when the supply terminal 228′ is at a positive polarity with respect to the supply terminal 228.

The operation of the time-delay circuit 216 will now be described. When the supply terminal 226 is at a positive polarity with respect to the supply terminal 226′, biasing current flows from the supply terminal 226 through the biasing resistor 56, the rectifier 58 in the forward direction, and the winding 28, to the supply terminal 226′, to thereby bias the magnetic core member 22 in accordance with the setting of the adjustable biasing resistor 56. At the same time, biasing current flows from the supply terminal 226 through the biasing resistor 56′, the rectifier 58′ in the forward direction, and the winding 28′, to the supply terminal 226′, to thus bias the magnetic core member 22′ in accordance with the setting of the adjustable biasing resistor 56′. In practice, the magnetic core members 22 and 22′ are biased an equal amount.

Assuming the polarity of the output voltage of the control source 82 is such that the control terminal 102 is at a positive polarity with respect to the control terminal 102′ and assuming further that the output voltage of the control source 218 is such that the control terminal 220′ is at a positive polarity with respect to the control terminal 220, control current flows from the control terminal 102 through the rectifier 58, the windings 28 and 28′, and the rectifier 58′, to the control terminal 102′. Since the control current through the winding 28 is additive to the biasing current flowing therethrough and since the control current flowing through the winding 28 is subtractive from the biasing current flowing therethrough, the magnetic core member 22 is reset further away from positive saturation than is the magnetic core member 22′.

During the next half-cycle of operation when the supply terminal 226′ is at a positive polarity with respect to the supply terminal 226, current flows from the supply terminal 226′ through the winding 28, the rectifier 38 in the forward direction, and the current-limiting resistor 34, to the supply terminal 226 to thus effect a gating of the magnetic core member 22. Simultaneously, current flows from the supply terminal 226′ through the winding 28′, the rectifier 38′ in the forward direction, and the current-limiting resistor 34′, to the supply terminal 226, to thereby effect a gating of the magnetic core member 22′. However, since the magnetic core member 22 under the assumed conditions had been reset to a level further away from positive saturation during the previous half-cycle of operation than had the magnetic core member 22′, the magnetic core member 22′ saturates before the magnetic core member 22. Once the magnetic core member 22′ saturates, a voltage appears across the load 90 of such polarity that the load terminal 92′ is at a positive polarity with respect to the load terminal 92. Then when the magnetic core member 22 saturates substantially no voltage appears across the load 90. However, when a voltage does appear across the load 90, this voltage is additive to the voltage appearing across the control terminals 220 and 220′, and this combined voltage effects a resetting of the magnetic core members 24 and 24′ during this same half-cycle of operation when the supply terminal 226′ is at a positive polarity with respect to the supply terminal 226.

At the same time the combined voltage across the load terminals 92 and 92′ and across the control terminals 220 and 220′ is effecting a resetting of the magnetic core members 24 and 24′, biasing current is flowing from the supply terminal 228 through the winding 30, the rectifier 230 in the forward direction, and the biasing resistor 232, to the supply terminal 228′. Simultaneously, biasing current is also flowing from the supply terminal 228 through the winding 30′, the rectifier 234 in the forward direction, and the biasing resistor 236, to the supply terminal 228′. Under the assumed conditions, the control current flowing through the winding 30′ is subtractive from the biasing current flowing therethrough and the control current through the winding 30 is additive to the biasing current flowing through the winding 30, and therefore the magnetic core member 24 is reset at a further level below positive saturation than is the magnetic core member 24′.

During the next half-cycle of operation, when the supply terminal 228′ is at a positive polarity with respect to the supply terminal 228, current flows from the supply terminal 228′ through the current-limiting resistor 42, and both branches of the parallel circuit 44, to the supply terminal 228, to thereby effect a gating of the magnetic core member 24 and a resetting of the magnetic core member 26 in accordance with the flux level to which the magnetic core member 24 had been reset during the previous half-cycle of operation. At the same time, current flows from the supply terminal 228′ through the current-limiting resistor 42′, and both branches of the parallel circuit 44′, to the supply terminal 228, to thus effect a gating of the magnetic core member 24′ and a resetting of the magnetic core member 26′ in accordance with the flux level to which the magnetic core member 24′ had been reset during the previous half-cycle of operation.

Since the magnetic core member 24 had been reset to a flux level further below positive saturation than the magnetic core member 24′, the magnetic core member 24′ saturates first and once it saturates, a voltage appears across the load 94 of such polarity that the load terminal 96 is at a positive polarity with respect to the load terminal 96′. Once the magnetic core member 24 saturates, substantially no voltage appears across the load 94.

During the next half-cycle of operation, when the supply terminal 288 again is as a positive polarity with respect to the supply terminal 228′, current flows from the supply terminal 228 through the winding 32, the rectifier 52 in the forward direction, and the current-limiting resistor 54, to the supply terminal 228′, to thus effect a gating of the magnetic core member 26. Simultaneously, current flows from the supply terminal 228 through the winding 32′, the rectifier 52′ in the forward direction, and the current-limiting resistor 54′, to the supply terminal 228′, to thus effect a gating of the magnetic core member 26′. During this half-cycle of operation, the magnetic core member 26′ saturates first, and then a voltage appears across the load 98 of such polarity that the load terminal 100′ is at a positive polarity with respect to the load terminal 100. This voltage appears across the load 98 until the magnetic core member 26 saturates, and then substantially no voltage appears across the load 98.

If the polarity of the output voltage of the control source 82 reverses, the polarity of the voltage across the load 90 also reverses, and then assuming the same output polarity for the voltage of the source 218, the voltage across the control terminals 220 and 220′ is subtractive from the voltage across the load 90, and this difference in voltage effects a resetting of the magnetic core members 24 and 24′. Then the polarity of the voltages across the loads 94 and 98 is dependent upon whether the voltage across the load 90 is larger or smaller than the control voltage appearing across the control terminals 220 and 220′.

On the other hand, if the polarity of both the voltages across the control terminals 102 and 102′ and across the control terminals 220 and 220′ reverses from the condition first assumed, the voltage across the load 90 is additive to the voltage across the control terminals 220 and 220′, and the polarity of the voltages across the loads 94 and 98 reverses from that polarity obtained under the first assumed conditions for the two control voltages.

It is to be understood that the reversible polarity direct-current control sources 82, 110 and 218, shown in FIGS. 2 through 4, can be replaced by a reversible-phase alternating control source (not shown) synchronized with and of the same frequency as the supply sources associated with the particular time-delay circuit. It is also to be understood that an alternating control source (not shown)

could be substituted for the direct-current control source 15 provided the polarity of the output of the alternating control source (not shown) is the same as that of the direct-current control source 15 during the reset half-cycle of operation when the magnetic core member 22 is being reset.

The apparatus and circuits embodying the teachings of this invention have several advantages. For instance, a single supply source can be utilized for the apparatus and circuits shown in FIGS. 1 through 3. In addition, it is only necessary to provide biasing on the first stage of that apparatus and circuits shown in FIGS. 1 through 3. Further, in the apparatus and circuits of FIGS. 1 through 4, the output from each stage is substantially independent of the magnitude of the supply voltage. Also, the apparatus and circuits of FIGS. 1 through 4 are extremely simple, considering the functions performed, thereby minimizing the original cost of the apparatus.

Since certain changes may be made in the above described apparatus and circuits and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a magnetic type delay line adapted to be connected to a source of alternating voltage, the combination comprising, a first magnetic stage including magnetic core means having winding means disposed in inductive relationship therewith, a second magnetic stage including magnetic core means having winding means disposed in inductive relationship therewith, circuit means for connecting said winding means of said first stage and said winding means of said second stage in parallel circuit relationship with respect to one another, current-limiting means, other circuit means for connecting said parallel circuit and said current-limiting means in series circuit relationship with respect to said source, so that current is permitted to flow from said source through both said winding means of said first stage and said winding means of said second stage only during alternate half-cycles of the output of said source to thus gate said magnetic core means of said first stage and reset said magnetic core means of said second stage, means for resetting the flux level in said magnetic core means of said first stage during the other alternate half-cycles of the output of said source, still other circuit means connected to said source for effecting a gating of said magnetic core means of said second stage during said other alternate half-cycles of the output of said source, and further circuit means for connecting a load across said winding means of said second stage.

2. In a magnetic type delay line adapted to be connected to a source of alternating voltage, the combination comprising, a first magnetic stage including a magnetic core member having a winding disposed in inductive relationship therewith, a second magnetic stage including a magnetic core member having a winding disposed in inductive relationship therewith, a third magnetic stage including a magnetic core member having a winding disposed in inductive relationship therewith, a parallel circuit, one branch of which includes a first rectifier and the winding of said first stage and the other branch of which includes a second rectifier and the winding of said second stage, current-limiting means, circuit means for connecting said parallel circuit and said current-limiting means in series circuit relationship with respect to said source, said first and said second rectifier being so poled as to permit, only during alternate half-cycles of the output of said source, the flow of current from said source through said parallel circuit and said current-limiting means to thus gate the magnetic core member of said first stage and reset the magnetic core member of said second stage, means for resetting the flux level in the magnetic core member of said first stage in accordance with a control signal during the other alternate half-cycles of the output of said source, another parallel circuit one branch of which includes a third rectifier and the winding of said second stage and the other branch of which includes a fourth rectifier and the winding of said third stage, other current-limiting means, other circuit means for connecting said another parallel circuit and said other current-limiting means in series circuit relationship with respect to said source, said third and said fourth rectifier being so poled as to permit, only during said other alternate half-cycles of the output of said source, the flow of current from said source through said other current-limiting means and said another parallel circuit to thus gate the magnetic core member of said second stage and reset the magnetic core member of said third stage, further circuit means connected to said source for effecting a gating of the magnetic core member of said third stage during said alternate half-cycles of the output of said source, and still other circuit means for connecting a load across the winding of said third stage.

3. In a magnetic type delay line adapted to be connected to a source of alternating voltage, the combination comprising, a first magnetic stage including a magnetic core member having a winding disposed in inductive relationship therewith, a second magnetic stage including a magnetic core member having a winding disposed in inductive relationship therewith, a third magnetic stage including a magnetic core member having a winding disposed in inductive relationship therewith, a parallel circuit, one branch of which includes a first rectifier and the winding of said first stage and the other branch of which includes a second rectifier and the winding of said second stage, current-limiting means, circuit means for connecting said parallel circuit and said current-limiting means in series circuit relationship with respect to said source, said first and said second rectifier being so poled as to permit, only during alternate half-cycles of the output of said source, the flow of current from said source through said parallel circuit and said current-limiting means to thus gate the magnetic core member of said first stage and reset the magnetic core member of said second stage, other circuit means for so connecting a first load in parallel circuit relationship with both branches of said parallel circuit that current flows through said load only during said alternate half-cycles of the output of said source, means for resetting the flux level in the magnetic core member of said first stage in accordance with a control signal during the other alternate half-cycles of the output of said source, another parallel circuit one branch of which includes a third rectifier and the winding of said second stage and the other branch of which includes a fourth rectifier and the winding of said third stage, other current-limiting means, further circuit means for connecting said another parallel circuit and said other current-limiting means in series circuit relationship with respect to said source, said third and said fourth rectifiers being so poled as to permit, only during said other alternate half-cycles of the output of said source, the flow of current from said source through said other current-limiting means and said another parallel circuit to thus gate the magnetic core member of said second stage and reset the magnetic core member of said third stage, still other circuit means for so connecting a second load in parallel circuit relationship with both branches of said another parallel circuit that current flows through said second load only during said other alternate half-cycles of the output of said source, still further circuit means connected to said source for effecting a gating of the magnetic core member of said third stage during said alternate half-cycles of the output of said source, and still other circuit means for so connecting a third load across the winding of said third stage that current flows through said third load only during said alternate half-cycles of the output of said source.

4. In a magnetic type delay line adapted to be connected to a source of alternating voltage, the combination comprising, a first magnetic stage including a magnetic core member having a winding disposed in inductive relationship therewith, a second magnetic stage including a magnetic core member having a winding disposed in inductive relationship therewith, a third magnetic stage including a magnetic core member having a winding disposed in inductive relationship therewith, a parallel circuit, one branch of which includes a first rectifier and the winding of said first stage, and the other branch of which includes a second rectifier and the winding of said second stage, current-limiting means, circuit means for connecting said parallel circuit and said current-limiting means in series circuit relationship with respect to said source, said first and said second rectifiers being so poled as to permit, only during alternate half-cycles of the output of said source, the flow of current from said source through said parallel circuit and said current-limiting means to thus gate the magnetic core member of said first stage and reset the magnetic core member of said second stage, further circuit means for connecting a biasing impedance, a third rectifier, and the winding of said first stage in series circuit relationship with respect to said source so that current is permitted to flow from said source through said biasing impedance, said third rectifier, and the winding of said first stage only during the other alternate half-cycles of the output of said source, still other circuit means, connected to the winding of said first stage, for effecting a resetting of the flux level in the magnetic core member of said first stage in accordance with a control signal during said other alternating half-cycles of the output of said source, another parallel circuit one branch of which includes a fourth rectifier and the winding of said second stage and the other branch of which includes a fifth rectifier and the winding of said third stage, other current-limiting means, other circuit means for connecting said another parallel circuit and said other current-limiting means in series circuit relationship with respect to said source, said fourth and said fifth rectifiers being so poled as to permit, only during said other alternate half-cycles of the output of said source, the flow of current from said source through said other current-limiting means and said another parallel circuit to thus gate the magnetic core member of said second stage and reset the magnetic core member of said third stage, further circuit means connected to said source for effecting a gating of the magnetic core member of said third stage during said alternate half-cycles of the output of said source, and still other circuit means for connecting a load across the winding of said third stage.

5. In a magnetic type delay line adapted to be connected to a source of alternating voltage and adapted to be controlled by a differential control signal, the combination comprising, a first magnetic stage including a first and a second magnetic core member each of which has a winding disposed in inductive relationship therewith, a second magnetic stage including a third and a fourth magnetic core member each of which has a winding disposed in inductive relationship therewith, a third magnetic stage including a fifth and a sixth magnetic core member each of which has a winding disposed in inductive relationship therewith, a first parallel circuit one branch of which includes a first rectifier and the winding of said first magnetic core member and the other branch of which includes a second rectifier and the winding of said third magnetic core member, a first current-limiting means, circuit means for connecting said first parallel circuit and said first current-limiting means in series circuit relationship with respect to said source, said first and said second rectifier being so poled as to permit, only during alternate half-cycles of the output of said source, a flow of current from said source through said first parallel circuit and said first current-limiting means, to thus gate said first magnetic core member and reset said third magnetic core member, a second parallel circuit, one branch of which includes a third rectifier and the winding of said second magnetic core member and the other branch of which includes a fourth rectifier and the winding of said fourth magnetic core member, a second current-limiting means, other circuit means for connecting said second parallel circuit and said second current-limiting means in series circuit relationship with respect to said source, said third and said fourth rectifiers being so poled as to permit, only during said alternate half-cycles of the output of said source, the flow of current from said source through said second parallel circuit and said second current-limiting means to thus gate said second magnetic core member and reset said fourth magnetic core member, means for resetting the flux level in said first and in said second magnetic core member in accordance with said differential control signal during the other alternate half-cycles of the output of said source, a third parallel circuit one branch of which includes a fifth rectifier and the winding of said third magnetic core member and the other branch of which includes a sixth rectifier and the winding of said fifth magnetic core member, a third current-limiting means, further circuit means for connecting said third parallel circuit and said third current-limiting means in series circuit relationship with respect to said source, said fifth and said sixth rectifier being so poled as to permit, only during said other alternate half-cycles of the output of said source, a flow of current from said source through said third current-limiting means and said third parallel circuit to thus gate said third magnetic core member and reset said fifth magnetic core member, a fourth parallel circuit one branch of which includes a seventh rectifier and the winding of said fourth magnetic core member and the other branch of which includes an eighth rectifier and the winding of said sixth magnetic core member, a fourth current-limiting means, still further circuit means for connecting said fourth parallel circuit and said fourth current-limiting means in series circuit relationship with respect to said source, said seventh and said eighth rectifier being so poled as to permit, only during said other alternate half-cycles of the output of said source, the flow of current from said source through said fourth current-limiting means and said fourth parallel circuit to thus gate said fourth magnetic core member and reset said sixth magnetic core member, still other circuit means connected to said source for effecting a gating of said fifth and said sixth magnetic core member during said alternate half-cycles of the output of said source, and still further circuit means for connecting a load across the combination of the winding of said fifth magnetic core member and the winding of said sixth magnetic core member.

6. In a magnetic type delay line adapted to be connected to a source of alternating voltage and adapted to be controlled by a differential control signal, the combination comprising, a first magnetic stage including a first and a second magnetic core member each of which has a winding disposed in inductive relationship therewith, a second magnetic stage including a third and a fourth magnetic core member each of which has a winding disposed in inductive relationship therewith, a third magnetic stage including a fifth and a sixth magnetic core member each of which has a winding disposed in inductive relationship therewith, a first parallel circuit one branch of which includes a first rectifier and the winding of said first magnetic core member and the other branch of which includes a second rectifier and the winding of said third magnetic core member, a first current-limiting means, circuit means for connecting said first parallel circuit and said first current-limiting means in series circuit relationship with respect to said source, said first and said second rectifiers being so poled as to permit, only during alternate half-cycles of the output of said source, the flow of current from said source through said first parallel circuit and said first current-limiting means, to thus gate said first magnetic core member and reset said third magnetic core member, a second parallel circuit one branch of which includes a third rectifier and the winding of said second magnetic core member and the other branch of which includes a fourth rectifier and the winding of said fourth magnetic core member, a second current-limiting means, other circuit means for connecting said second parallel circuit and said second current-limiting means in series circuit relationship with respect to said source, said third and said fourth rectifier being so poled as to permit, only during said alternate half-cycles of the output of said source, the flow of current from said source through said second parallel circuit and said second current-limiting means to thus gate said second magnetic core member and reset said fourth magnetic core member, further circuit means for connecting a first biasing impedance, a fifth rectifier, and the winding of said first magnetic core member in series circuit relationship with respect to said source, other circuit means for connecting a second biasing impedance, a sixth rectifier, and the winding of said second magnetic core member in series circuit relationship with respect to said source so that current is permitted to flow from said source through said first biasing impedance, said fifth rectifier and the winding of said first magnetic core member and through said second biasing impedance, said sixth rectifier and the winding of said second magnetic core member only during the other alternate half-cycles of the output of said source, further circuit means connected to the winding of said first magnetic core member and to the winding of said second magnetic core member for effecting a resetting of said flux level in said first and said second magnetic core member in accordance with said differential control signal during said other alternate half-cycles of the output of said source, a first load connected to be energized in accordance with the combined voltage across the winding of said first magnetic core member and the winding of said second magnetic core member, a third parallel circuit, one branch of which includes a seventh rectifier and the winding of said third magnetic core member and the other branch of which includes an eighth rectifier and the winding of said fifth magnetic core member, third current-limiting means, further circuit means for connecting said third parallel circuit and said third current-limiting means in series circuit relationship with respect to said source, said seventh and said eighth rectifier being so poled as to permit, only during said other alternate half-cycles of the output of said source, a flow of current from said source through said third current-limiting means and said third parallel circuit to thus gate said third magnetic core member and reset said fifth magnetic core member, a fourth parallel circuit, one branch of which includes a ninth rectifier and the winding of said fourth magnetic core member and the other branch of which includes a tenth rectifier and the winding of said eighth magnetic core member, a fourth current-limiting means, still further circuit means for connecting said fourth parallel circuit and said fourth current-limiting means in series circuit relationship with respect to said source, said ninth and said tenth rectifier being so poled as to permit, only during said other alternate half-cycles of the output of said source, the flow of current from said source through said fourth current-limiting means and said fourth parallel circuit to thus gate said fourth magnetic core member and reset said sixth magnetic core member, a second load connected to be energized in accordance with the combined voltage across the winding of said third magnetic core member and the winding of said fourth magnetic core member, still other circuit means connected to said source for effecting a gating of said fifth and said sixth magnetic core members during said alternate half-cycles of the output of said source, and still further circuit means for connecting a third load across the combination of the winding of said fifth magnetic core member and the winding of said sixth magnetic core member.

References Cited in the file of this patent

UNITED STATES PATENTS

| | | |
|---|---|---|
| 2,717,965 | Ramey | Sept. 13, 1955 |
| 2,747,109 | Montner | May 22, 1956 |
| 2,770,737 | Ramey | Nov. 13, 1956 |
| 2,800,596 | Bolie | July 23, 1957 |
| 2,875,398 | Stateman | Feb. 24, 1959 |
| 2,875,432 | Markow | Feb. 24, 1959 |